United States Patent

Chen

[11] Patent Number: 4,516,112
[45] Date of Patent: May 7, 1985

[54] TRANSPARENT TOUCH SWITCHING SYSTEM

[75] Inventor: Chee G. Chen, Brown Deer, Wis.

[73] Assignee: Eaton Corporation, Cleveland, Ohio

[21] Appl. No.: 351,081

[22] Filed: Feb. 22, 1982

[51] Int. Cl.³ .............................................. G08C 9/00
[52] U.S. Cl. ........................... 340/365 R; 340/365 A; 340/712; 310/311; 310/330
[58] Field of Search ............... 340/365 R, 365 A, 712, 340/711, 365 VL; 310/311, 330–332, 328, 325, 317, 319, 339, 800; 400/479.1, 479.2; 200/DIG. 1; 364/709; 179/90 K; 178/17 C

[56] References Cited

U.S. PATENT DOCUMENTS

| | | | |
|---|---|---|---|
| 3,495,232 | 2/1970 | Wagner | 340/365 A |
| 3,591,749 | 7/1971 | Comstock | 340/365 A |
| 3,935,485 | 1/1976 | Yoshida et al. | 340/365 A |
| 3,940,637 | 2/1976 | Ohigashi et al. | 340/365 A |
| 4,186,392 | 1/1980 | Holz | 340/712 |
| 4,190,785 | 2/1980 | Kompanek | 340/365 A |
| 4,224,615 | 9/1980 | Penz | 340/712 |
| 4,286,289 | 8/1981 | Ottesen et al. | 340/365 A |
| 4,307,383 | 12/1981 | Brienza | 340/365 R |
| 4,310,839 | 1/1982 | Schwerdt | 340/365 R |

FOREIGN PATENT DOCUMENTS 92634  7/1981  Japan ............................ 340/365 A

OTHER PUBLICATIONS

Naval Research Reviews, May 1978, pp. 9–11.

*Primary Examiner*—Donnie L. Crosland
*Attorney, Agent, or Firm*—Andrus, Sceales, Starke & Sawall

[57] ABSTRACT

A transparent touch switching system is provided for direct overlay on a display screen to enable operator input by merely touching the screen. A piezoelectric polymer film is supported above the screen for selective localized depression towards the screen. The film has transparent flexible conductive coatings on opposite sides thereof for voltage generation in response to depression of the film.

3 Claims, 4 Drawing Figures

TRANSPARENT TOUCH SWITCHING SYSTEM

TECHNICAL FIELDS

The invention relates to an input system for a display screen such as a CRT, LCD, and the like. More particularly, a transparent touch actuated switching system is overlayed directly on the display screen such that the operator may enter input commands by merely touching the screen at designated areas.

BACKGROUND AND SUMMARY

Transparent touch switching systems for display screens are known in the art. One type of switching system relies upon a change capacitance occuring when the operator applies pressure to a front transparent covering plate to deflect it toward a rear substrate, Penz, U.S. Pat. No. 4,224,615.

Another type of transparent touch switching system relies upon physical engagement of contacts: Fluke 1702A Instrument Controller; Sierracin Transflex TM Membrane Switch.

The present invention employs a different approach and uses a piezoelectric polymer film supported above the screen for selective localized depression towards the screen. The film has transparent flexible conductive coatings on opposite sides thereof for voltage generation in response to depression of the film.

Piezoelectric polymer films are known in the art: Naval Research Reviews, May 1978, Pages 9–11; commercially available from Pennwalt Corporation. Piezoelectric polymer films have been used for input switching systems, but only in keyboard applications: Yoshida et al U.S. Pat. No. 3,935,485; Ohigashi et al U.S. Pat. No. 3,940,637.

DETAILED DESCRIPTION

Figure 1:
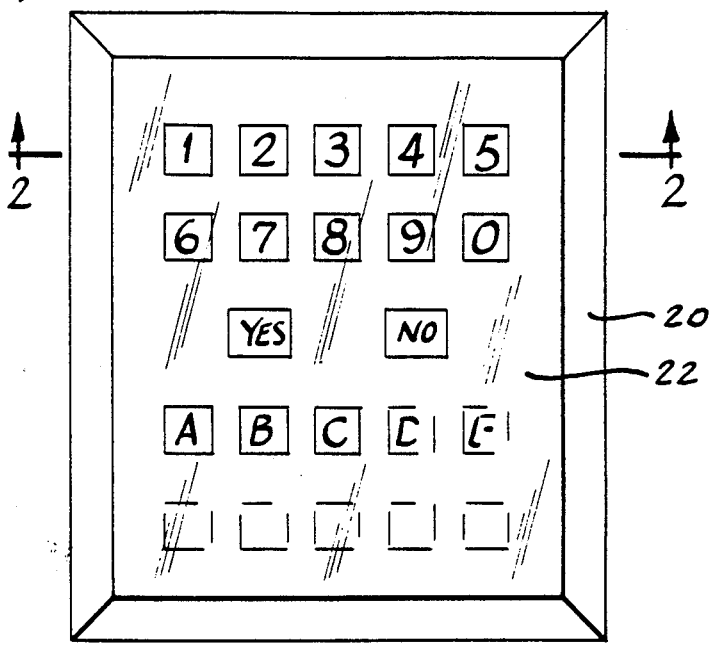
FIG. 1 is a schematic view of a display screen and transparent input system of the present invention.

FIG. 1 shows a housing 20 having a display screen 22, such as a CRT, LCD, or the like. The screen may display textual information, pictorial information, alphanumeric information, or any of a variety of other types of data or visual displays.

Figure 4:
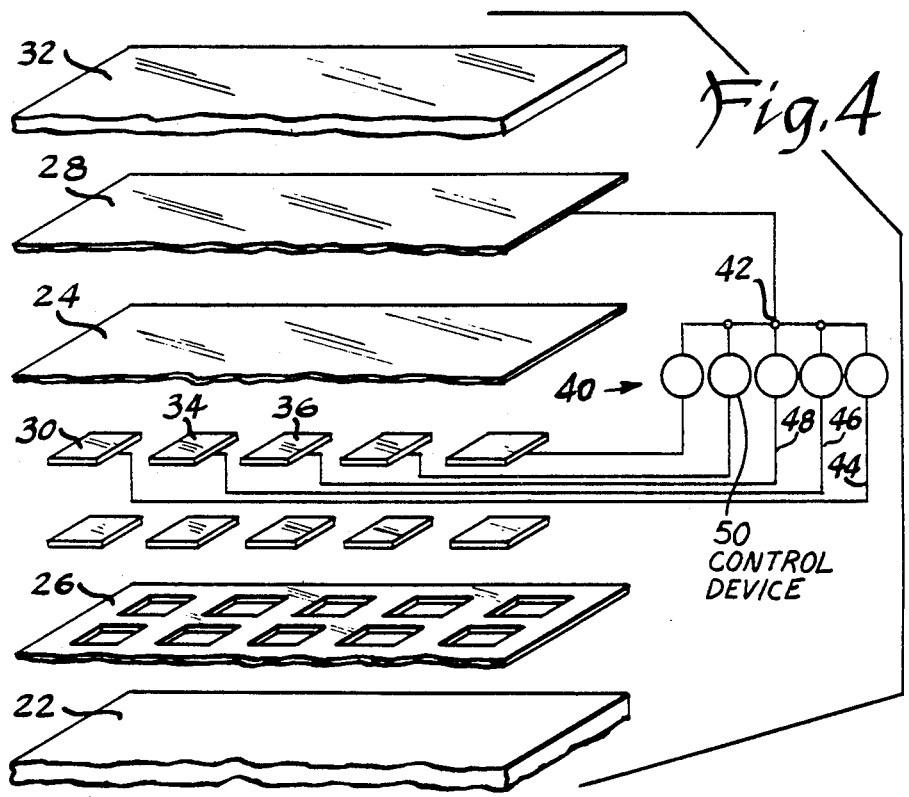
FIG. 4 is an exploded isometric view of the input system of the invention.
Figure 2:
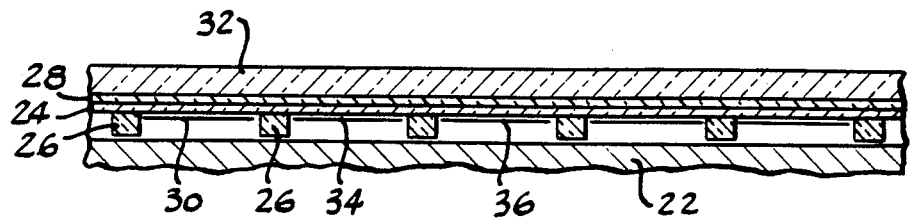
FIG. 2 is a cross sectional view taken along line 2—2 of FIG. 1.
Figure 3:
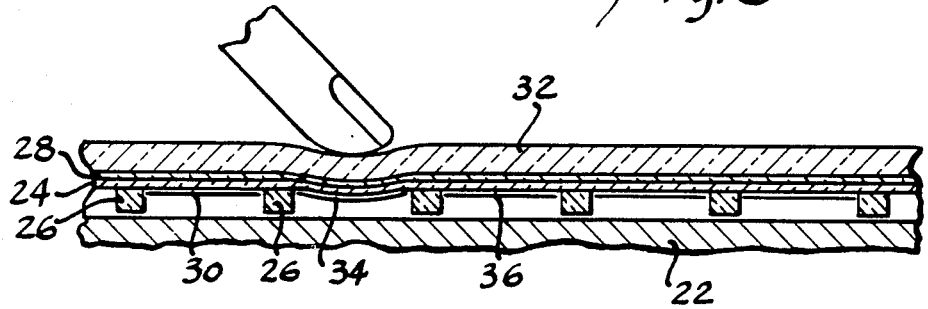
FIG. 3 is a view like FIG. 2, but shows a touch actuated depressed condition.

Referring to FIGS. 2 through 4, the input system of the present invention includes a piezoelectric polymer film 24 supported above screen 22 by non-conductive transparent spacer means 26 in a grid-like or matrix pattern. Film 24 has transparent flexible conductive coatings such as 28 and 30 on opposite sides thereof for voltage generation in response to depression of the film, FIG. 3. A protective flexible transparent front covering 32 is provided over top coating 28.

In preferred form, the coating on one side of the film is a continuous transparent flexible conductive sheet, for example sheet 28. The other side of piezoelectric polymer film 24 is coated at selected separate areas with transparent flexible conductive sheet segments, such as segments 30, 34, 36 and so on, FIGS. 2 and 4. Spacer means 26 supports film 24 above screen 22, with designated sheet segments above designated sections of the screen. For example, sheet segment 30 is above a designated section of screen 22, sheet segment 34 is above another designated section of screen 22, and so on.

Circuit connection means 40, FIG. 4, has a common terminal 42 connected to continuous sheet 28 on the top side of piezoelectric polymer film 24, and has a plurality of separate dedicated terminals, such as terminals 44, 46, 48 and so on, each connected to a respective one of the sheet segments on the bottom side of film 24. For example, terminal 44 is connected to sheet segment 30, terminal 46 is connected to sheet segment 34, terminal 48 is connected to sheet segment 36, and so on.

Depression of piezoelectric polymer film 24 by a finger or the like, FIG. 3, above one of the designated sections of screen 22, flexes the piezoelectric material at that location. This induces a voltage across the conductive plates on the opposite sides of film 24, and hence a voltage is developed between common terminal 42 and the dedicated terminal connected to the corresponding sheet segment. For example, touch actuation at sheet segment 34, FIG. 3, causes a voltage to be developed between terminal 46 and terminal 42, which voltage is usable as a trigger signal to drive designated circuitry, such as control device 50. Touch activation at any of the other sheet segments likewise causes voltage to be developed between the corresponding dedicated terminal and common terminal 42, which voltage may likewise be used as a trigger signal to drive designated circuitry comparable to control device 50, as shown. The common connection to terminal 42 may be through ground.

As above-noted, transparent piezoelectric polymer film is known and commercially available. In the preferred embodiment, PVDF (polyvinylidene fluoride) film of thickness 20–100 micrometers is used. The transparent flexible conductive sheets 28, 30, 34 and so on are preferably ITO (indium tin oxide) coated on the surface of piezoelectric polymer film 24 by RF sputtering. RF sputtering is a well known process for thin film deposition. RF sputtering apparatus and ITO targets are likewise well known, and are readily available from commercial vendors, such as Varian. Spacer means 26 is preferably a thin (eg 0.005 inch) non-conductive plastic or glass sheet with a plurality of apertures therethrough forming a waffle-like grid pattern or matrix, with the apertures beneath designated sheet segments 30, 34 and so on. Protective front flexible transparent cover 32 is preferably a thin (eg 0.003 inch) non-conductive plastic or glass sheet. Circuit connection means 40 with common terminal 42 and dedicated terminals 44, 46, 48 and so on, is preferably formed during the RF sputtering above-noted, with the mask configuration providing the dedicated terminal structure.

It is recognized that various modifications are possible within the scope of the appended claims.

What is claimed is:

1. A transparent touch switching system comprising a display screen, a transparent flexible piezoelectric polymer film supported above said screen for selective localized bending depression by a user's finger or the like towards said screen, said film having transparent flexible conductive coatings on opposite sides thereof for voltage generation in response to bending depression of said film, wherein said transparent flexible conductive coating on one side of said film is a continuous sheet, and said transparent flexible conductive coating on the other side of said film comprises a plurality of separate discrete sheet segments at selected separate areas, and comprising spacer means formed by a nonconductive transparent sheet supporting said piezoelectric polymer film above said screen and having a plurality of apertures through said sheet forming a waffle-like grid or matrix with each aperture aligned beneath a designated said discrete sheet segment, and including circuit connection means connected to said coatings for using said voltage as a trigger signal to drive designated circuitry.

2. A transparent touch switching system comprising:
 a display screen;
 a transparent flexible piezoelectric polymer film coated on one side with a continuous transparent flexible conductive sheet and coated on the other side at selected separate areas with a plurality of discrete transparent flexible conductive sheet segments;
 spacer means supporting said piezoelectric polymer film above said screen, with designated said discrete sheet segments above designated sections of said screen, said spacer means comprising a nonconductive transparent sheet with a plurality of apertures therethrough forming a waffle-like grid or matrix, each said aperture aligned beneath a designated said discrete sheet segment such that said film may be bendingly depressed toward said screen in the localized areas of said discrete sheet segments; and
 circuit connection means having a common terminal connected to said continuous sheet on said one side of said piezoelectric polymer film, and having a plurality of separate dedicated terminals each connected to a respective one of said discrete sheet segments on said other side of said piezoelectric polymer film, such that bending depression of said piezoelectric polymer film by a finger or the like above one of said designated sections of said screen causes a voltage to be developed between said common terminal and the dedicated terminal connected to the corresponding discrete sheet segment, said voltage being usable as a trigger signal to drive designated circuitry.

3. The invention according to claim 2 comprising a front flexible transparent protective cover above said piezoelectric polymer film and its top side coating for touch actuation by a user.

* * * * *